United States Patent [19]
Richardson

[11] Patent Number: 5,265,646
[45] Date of Patent: Nov. 30, 1993

[54] VALVE SPACER PLATE

[75] Inventor: Russell D. Richardson, Mooresville, N.C.

[73] Assignee: Ingersoll-Rand Company, Woodcliff Lake, N.J.

[21] Appl. No.: 32,367

[22] Filed: Mar. 17, 1993

[51] Int. Cl.$^5$ .............................................. F16K 15/16
[52] U.S. Cl. .................. 137/856; 137/512.15; 417/571
[58] Field of Search ................. 137/512.15, 856; 417/571

[56] References Cited

U.S. PATENT DOCUMENTS

| | | |
|---|---|---|
| 2,908,287 | 10/1957 | Augustin . |
| 3,679,333 | 7/1972 | Zoppi . |
| 3,962,214 | 12/1975 | Hrabal ............................ 137/856 X |
| 4,585,209 | 4/1986 | Aine et al. . |
| 4,976,284 | 12/1990 | Hovarter ........................ 137/856 X |
| 5,145,190 | 9/1992 | Boardman . |

Primary Examiner—Robert G. Nilson
Attorney, Agent, or Firm—Victor M. Genco, Jr.

[57] ABSTRACT

A valve spacer plate assembly includes a rigid plate member having first and second outer surfaces and at least one opening extending therethrough. The assembly also includes at least one gasket member disposed on one of the outer surfaces of the rigid plate member. The gasket member circumscribes at least one of the openings. A spaced portion circumscribes the edge of the openings, and forms a seating ledge against which the free end of a blade valve may rest.

2 Claims, 2 Drawing Sheets

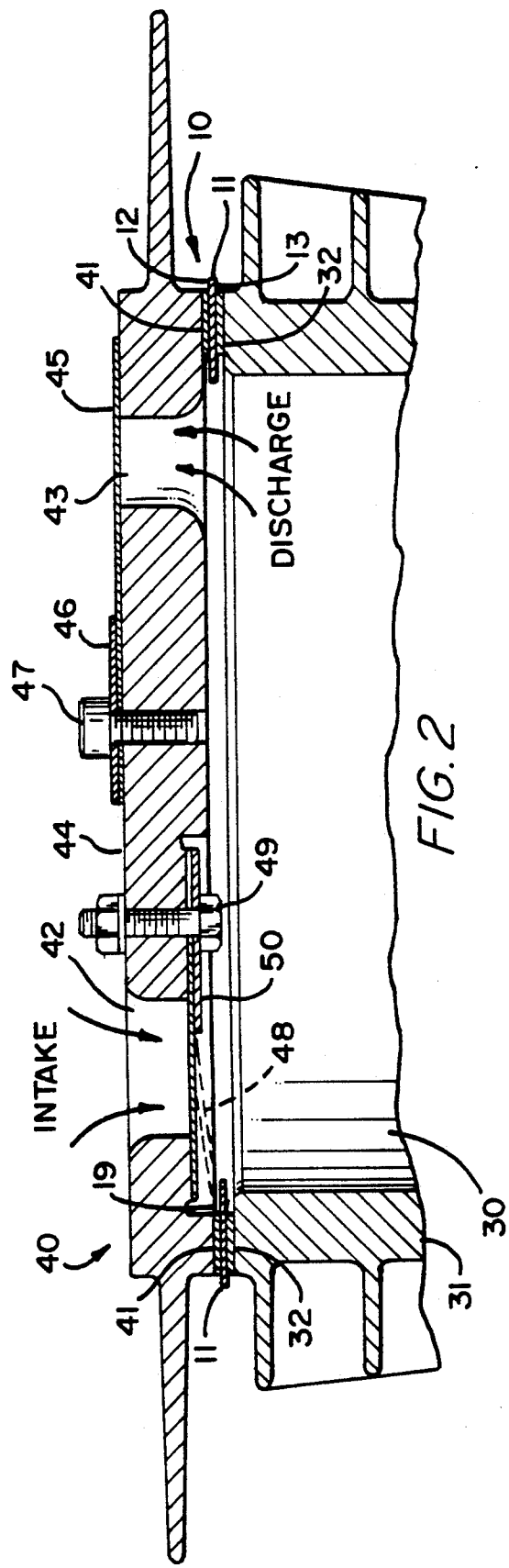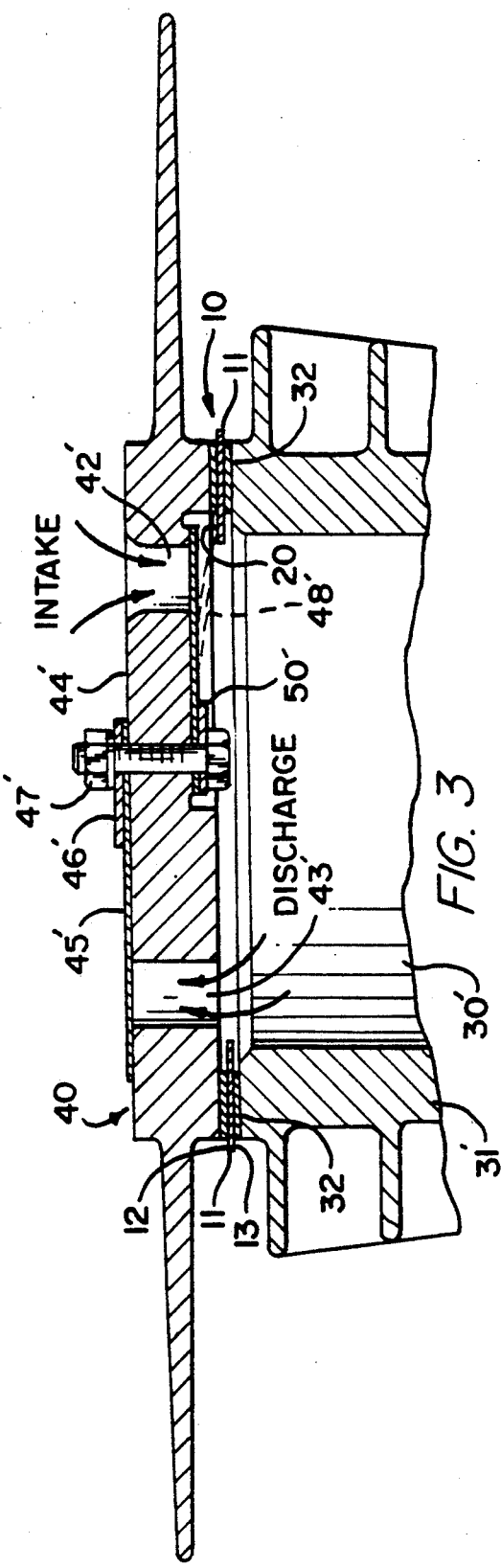

VALVE SPACER PLATE

BACKGROUND OF THE INVENTION

This invention generally relates to a valve spacer plate for a piston-type air compressor, and more particularly to a valve spacer plate assembly which provides a gasket on each side of a plate, and a seating ledge on the plate for a reed or finger valve.

Some air compressors utilize reed or finger valves as intake and exhaust valves. These finger valves continuously flex to open and closed positions with each cycle of a compressor piston. As the piston operates through the intake stroke, air is drawn through the intake port into the compression chamber. The blades or fingers of the discharge valve block the ports to prevent any back leak of air already pumped out of the compression chamber. The incoming air impinges upon each inlet valve, permitting the inlet valve, i.e. the fingers or blades thereof, to open. In this regard, the individual fingers are lifted away from the inlet port a predetermined distance which permits the inlet air to move into the compression chamber.

When compressed air is expelled from the compression chamber, the inlet valve prevents leakage back through the inlet ports, whereby all outlet flow is only through the outlet ports. The outgoing air impinges upon the outlet valve, which would normally be blocking the outlet passage, and lifts this valve away from the outlet port thereby permitting the expelled air to leave only through the outlet port.

Typically, the fingers or blades are fixedly clamped at one end of the blade with the other blade end free to move with the lifting strokes of the compressor. The blades are of comparatively simple construction and their lift is limited, solely by a stop member.

To date many compressor designs have employed complex valve stops which are integral with a head or cylinder of a compressor. These valve stops are operable to prevent the tip of the blades from flexing past a predetermined point. However, difficult and expensive machining techniques have been required to produce these complex valve stops.

With extended compressor operating hours, the integral valve stops become worn. As a result of this wear, the valve lift is changed and the valve life is shortened. Additionally, when such wear has occurred, present compressors often require cylinder or head replacement or these compressors must be remachined.

The foregoing illustrates limitations known to exist in present compressor designs. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a valve spacer plate assembly for supporting a blade valve tip and for sealing adjacent surfaces of an intake port, an outlet port and a compression chamber of an air compressor. The valve spacer plate assembly includes a plate member having a first and second outer surface and having at least one opening extending therethrough. At least one gasket member is disposed on one of the outer surfaces of the plate member. The gasket member circumscribes at least one of the openings. Additionally, a spaced portion circumscribes the edge of the opening. The spaced portion forms a seating ledge for the free end of a valve blade.

The foregoing and other aspects will become apparent from the following detailed description of the invention when considered in conjunction with the accompanying drawing figures.

BRIEF DESCRIPTION OF THE DRAWING FIGURES

FIG. 2 is an axial section taken along line 2—2 in FIG. 1, through a first-stage compression cylinder showing the spacer plate of the present invention;

FIG. 3 is an axial section taken along line 3—3 in FIG. 1, through a second-stage compression cylinder showing the present invention.

DETAILED DESCRIPTION

Figure 4:
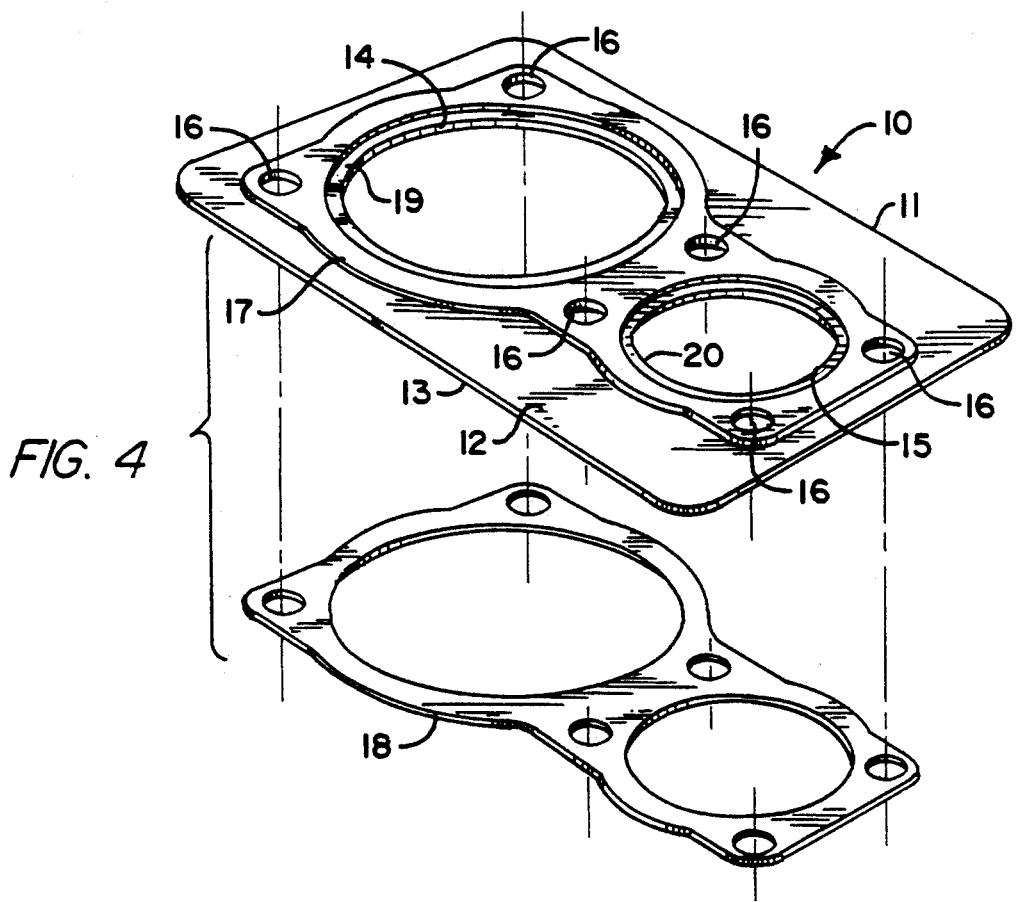
FIG. 4 is a perspective, partially exploded view of the spacer plate assembly of the present invention.

Referring now to the drawings, and in particular, FIGS. 2-4, there is shown generally at 10 a valve spacer plate assembly according to the present invention for a two-stage air compressor. Although the valve spacer plate is illustrated in combination with a two-stage air compressor, the valve spacer plate may also be used with a single stage compressor, or similarly with other multi-stage compressors. The valve spacer plate assembly 10 is placed for operation between a compression chamber 30 and adjacent surfaces of a compressor valve plate 40, which includes an intake port and a discharge port. As should be understood, the valve spacer plate assembly 10 seals the gap between the adjacent surfaces and provides a seating ledge for the tip of a blade valve as will be described in further detail hereinafter.

The valve spacer plate 10 includes a plate member 11. The plate member 11 is generally flat or planar having opposed first 12 and second 13 outer surfaces. The plate member 11 is preferably rigid and is made out of a relatively thin sheet of inflexible, nonpermanently deformable material, e.g., steel, aluminum alloy and the like. It should be appreciated that the rigid plate member 11 may be made of any suitable material that provides both the desired stiffness and sufficient wearability.

The plate member 11 has at least one, preferably a plurality of enlarged openings 14, 15 extending therethrough. The enlarged openings 14, 15 are aligned with the intake ports and discharge ports, respectively, of the compression chambers to allow for the flow of air. The rigid plate member 11 also includes at least one, and preferably, a plurality of fastener openings 16. In the preferred embodiment shown in FIG. 4, six fastener openings 16 are provided, although the number may be varied. The fastener openings 16 allow a fastener, such as a bolt, to secure the compression chamber, the compressor head, valve plate and the spacer plate assembly 10 together as a single unit.

The top and bottom outer surfaces 12 and 13, respectively, abut the bottom surface 41 of the valve plate 40, and an adjacent upper surface 32 of a compression chamber wall 31. In the preferred embodiment, the valve spacer plate assembly 10 includes gasket members 17 and 18 which are each made integral with the valve spacer plate assembly 10. For purposes of illustration only, FIG. 4 shows gasket 18 exploded away from the surface 13 upon which it is fixedly mounted. Each of the gasket members are fixedly disposed on one of the outer surfaces of the rigid plate member, and circumscribe at least one of the openings. Each gasket member is relatively thin and composed of elastic, permanently deformable gasket material, like a fabric, such as felt, or a substantially rigid rubber, or the like. In a gasket deformed state, the entire assembly has the proper thickness to permit the desired lift of the free ends of the blade valves. Each of the gaskets which circumscribe the enlarged plate openings 14, 15 are slightly larger than the enlarged plate opening to thereby provide ledge areas 19 and 20. Each ledge area is sufficiently wide to provide a seat to stop the movement of the free end of a blade valve. Accordingly, the ledge areas 19, 20 are operable as valve stops.

Figure 1:
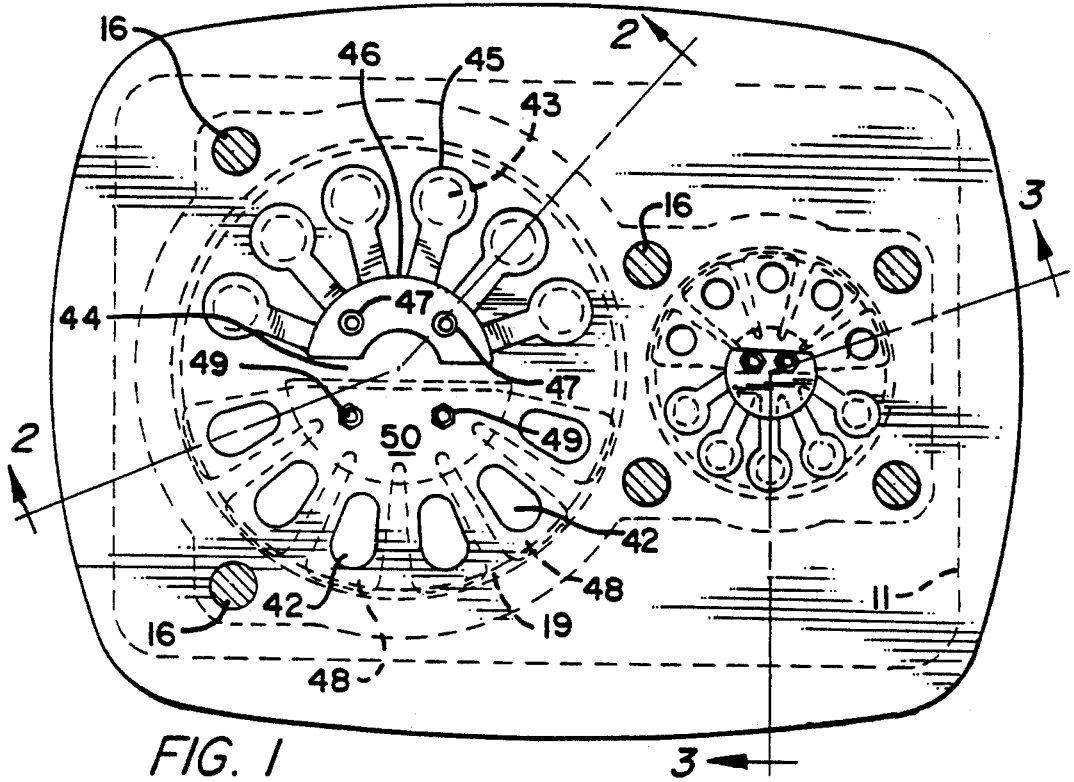
FIG. 1 is a plan view of a valve assembly illustrating the spacer plate of the present invention in phantom.

Turning now to FIG. 1, there is shown the valve arrangement of a conventional two-step air compressor. As shown in FIGS. 2 and 3, the valve spacer plate 10 of the present invention is positioned between the compressor chamber 30, the piston of which (not shown) alternately increases and decreases in volume as the piston respectively descends and ascends, and the valve plate 40. The valve plate 40 is secured by conventional bolts through the fastener openings 16. The valve plate 40 accommodates the two-stage compressor having a large compression chamber 30 and a smaller second stage compression chamber 30'.

In FIG. 2, the valve plate 40 includes an intake port 42 which fluidly communicates with a source of air or other gas to be pumped, and a discharge port 43 which communicates, through an outlet conduit (not shown), to the second stage compression chamber or to a means for receiving the compressed air. First stage ports 42, 43 are separated by a divider 44 which extends across the entire interior of the opening separating the inlet port from the discharge port.

In operation, when the compressor piston is descending, blade valve 48 moves away from its sealing position of the intake port 42, and the free end of the blade rests on the ledge 19. As should be understood, the intake area can consist of a plurality of inlet ports, as can be seen in FIG. 1, and each port has a finger, reed or blade valve 48 which is secured at the end away from the free end by bolts 49 and securing plate 50. On the discharge side, blade valves 45 are provided to seal the discharge port 43. The blade valves 45 are attached by bolts 47 and securing plate 46. When the piston is ascending, the valve blades, of course, operate in the opposite direction.

As shown in FIG. 3, the compressed gas from the first stage compression may be further compressed in the second stage which includes compression chamber 30', compression chamber wall 31', intake port 42' and discharge port 43', all of which operate similarly to the first stage elements. Second stage ports 42', 43' are separated by a divider 44' which extends across the entire interior of the opening separating the inlet port from the discharge port.

When the air is coming into the second stage intake port, blade valve 48' moves away from its sealing position of intake port 42', and the free end of blade 48' rests on ledge 20. The intake area can consist of a plurality of inlet ports, as can be seen in FIG. 1, and each port has a blade valve 48'. On the discharge side, blade valves 45' are provided to seal the discharge port 43'. When the piston is ascending, the valve blades, of course, operate in the opposite direction.

While this invention has been illustrated and described in accordance with a preferred embodiment, it is recognized that variations and changes may be made therein without departing from the invention as set forth in the following claims.

Having described the invention, what is claimed is:

1. In a reciprocating compressor having a valve plate and a compression chamber defined by an interior compression chamber wall, a valve spacer plate assembly for supporting a blade valve tip and for sealing adjacent surfaces of an intake port, a discharge port, and the compression chamber, the valve spacer plate assembly comprising:

a rigid, nonpermenantly deformable plate member having opposite first and second outer surfaces, and having at least one opening extending therethrough alignable with the intake and discharge ports of the compression chamber;

at least one gasket sealing member fixedly disposed on each of the outer surfaces of the plate member and circumscribing the at least one opening of the rigid plate member; and a spaced portion circumscribing the edge of the at least one opening to form a seating ledge between the edge of the at least one opening and a respective gasket sealing member, the seating ledge extending circumfrentially, inwardly a predetermined distance into the compression chamber, from the interior compression chamber wall, to provide a seat to stop the movement of a free end of a blade valve.

2. A valve spacer plate assembly for supporting a blade valve tip, and for sealing adjacent surfaces of an intake port, a discharge port, and a compression chamber of an air compressor, the valve spacer plate comprising:

a rigid plate member having a first and second outer surface and having at least one opening extending therethrough;

at least one gasket disposed on each of the outer surfaces of the rigid plate member, the at least one gasket circumscribing the at least one opening; and a spaced portion circumscribing the edge of the opening to form a seating ledge between the edge of the opening and the gasket member, the seating ledge extending circumfrentially, inwardly a predetermined distance from the interior compression chamber wall to provide a seat to stop the movement of a free end of a blade valve.

* * * * *